(12) United States Patent
Porten et al.

(10) Patent No.: US 8,904,996 B2
(45) Date of Patent: Dec. 9, 2014

(54) METHOD AND CONTROL UNIT FOR OPERATING AN INJECTOR OF AN INTERNAL COMBUSTION ENGINE

(75) Inventors: Guido Porten, Vaihingen/Enz (DE); Markus Amler, Leonberg-Gebersheim (DE); Matthias Walz, Wiernsheim (DE); Alexandra Woerz, Schwieberdingen (DE); Ralf Hofmann, Esslingen (DE); Arthur Pichlkostner, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 264 days.

(21) Appl. No.: 13/323,145

(22) Filed: Dec. 12, 2011

(65) Prior Publication Data

US 2012/0152203 A1 Jun. 21, 2012

(30) Foreign Application Priority Data

Dec. 20, 2010 (DE) .......................... 10 2010 063 559

(51) Int. Cl.
| | |
|---|---|
| F02B 3/10 | (2006.01) |
| F02D 41/30 | (2006.01) |
| F02D 41/40 | (2006.01) |
| F02D 41/28 | (2006.01) |
| F02D 41/22 | (2006.01) |
| F02D 41/20 | (2006.01) |

(52) U.S. Cl.
CPC ............. *F02D 41/2096* (2013.01); *Y02T 10/44* (2013.01); *F02D 41/402* (2013.01); *F02D 2041/2051* (2013.01); *F02D 41/28* (2013.01); *F02D 41/221* (2013.01)
USPC ............................ 123/299; 123/479; 701/105

(58) Field of Classification Search
CPC .... F02D 41/40; F02D 41/402; F02M 2051/00
USPC ......... 123/299, 300, 305, 472, 478, 479, 480; 701/105
See application file for complete search history.

(56) References Cited

U.S. PATENT DOCUMENTS

| | | | | |
|---|---|---|---|---|
| 7,500,471 | B2 * | 3/2009 | Adachi et al. .................. | 123/436 |
| 7,865,293 | B2 * | 1/2011 | Ishizuka et al. ............... | 701/104 |
| 8,046,153 | B2 * | 10/2011 | Kurtz et al. .................... | 701/103 |
| 8,051,829 | B2 * | 11/2011 | Kurtz et al. .................... | 123/305 |
| 8,267,065 | B2 * | 9/2012 | Kurtz et al. .................... | 123/305 |
| 8,442,744 | B2 * | 5/2013 | Kurtz et al. .................... | 701/104 |
| 2011/0307164 | A1 * | 12/2011 | Arihara et al. ................. | 701/105 |
| 2012/0323468 | A1 * | 12/2012 | Miyaura et al. ................ | 701/105 |

* cited by examiner

*Primary Examiner* — Hai Huynh
(74) *Attorney, Agent, or Firm* — Kenyon & Kenyon LLP

(57) ABSTRACT

In a method for operating an injector of an internal combustion engine of a motor vehicle, in which an actuator for driving a component of the injector is provided, the actuator is controlled in such a way that at least two partial injections are brought about within a working cycle of the internal combustion engine. For each partial injection, a starting point in time of the partial injection is ascertained.

19 Claims, 2 Drawing Sheets

METHOD AND CONTROL UNIT FOR OPERATING AN INJECTOR OF AN INTERNAL COMBUSTION ENGINE

BACKGROUND OF THE INVENTION

1. Field of the Invention

The present invention relates to a method and a control device for operating an injector of an internal combustion engine, in particular of a motor vehicle, in which an actuator for driving a component of the injector is provided, and in which the actuator is controlled in such a way that at least two partial injections are brought about within one working cycle of the internal combustion engine.

2. Description of Related Art

Subdividing a fuel injection of an internal combustion engine into multiple partial injections is already known. For example, for direct-injecting internal combustion engines an operating mode is known in which one or multiple subsequent injections is/are carried out in addition to a main injection in order to heat up an exhaust system of the internal combustion engine as quickly as possible, for example so that a catalytic converter of the internal combustion engine reaches its operating temperature in the shortest possible time.

The various partial injections may usually be distributed over an intake stroke as well as a compression stroke of the internal combustion engine. Partial injections may also extend into a working stroke of a particular cylinder of the internal combustion engine.

BRIEF SUMMARY OF THE INVENTION

An object of the present invention is to improve an operating method for an injector of the type mentioned at the outset, as well as a control unit for an injector of this type, in such a way that improved diagnosis of the operation of the injector is provided.

For the method of the type mentioned at the outset, this object is achieved according to the present invention in that in each case a starting point in time of the at least two partial injections is ascertained. In this way, it is advantageously possible to monitor a position over time of the at least two partial injections and match same, for example, to corresponding setpoint values for the starting points in time. When the discrepancy between the setpoint starting points in time and the actual starting points in time of the at least two partial injections which are ascertained according to the present invention is excessively large, an appropriate error response, for example an error entry into an error memory of a control unit or the like, may be triggered.

According to another specific embodiment, at least one end point in time of at least one partial injection is also ascertained in a particularly advantageous manner.

In another advantageous specific embodiment, it is provided that for at least one partial injection, an injection duration is ascertained which corresponds to the particular partial injection, which is advantageously made possible by using the starting points in time and end points in time obtained according to the present invention. Thus, in addition to information concerning the position over time of the particular partial injection, for example in relation to a crankshaft angle of the internal combustion engine, the actual injection duration may also be evaluated, which in a manner known per se allows the fuel quantity that is actually injected to be deduced.

In another specific embodiment, particularly precise monitoring is provided, in which in each case a starting point in time and/or an end point in time and/or an injection duration which corresponds to the particular partial injection is/are ascertained for all partial injections of the working cycle.

A diagnosis of all partial injections with regard to their position over time or their injection duration is thus advantageously provided, which also allows future legal or regulatory requirements for monitoring the emission characteristics of the internal combustion engine or the injector to be met.

In another very advantageous specific embodiment of the method according to the present invention, it is provided that a control module for controlling the actuator is provided, the control module being supplied with a control instruction as an input signal which characterizes a desired control point in time for controlling the actuator, and after the control instruction has been implemented the control module outputting a confirmation signal which indicates the implementation of the control instruction.

For example, the control module may be an application-specific integrated circuit (ASIC) or a programmable logic module or the like. The control module may be provided, for example, directly for controlling semiconductor switches which act on the actuator of the injector via at least one electrical operating variable, for example via a voltage and/or a current. The control module may be used particularly advantageously together with a primary control device of a control unit which controls the injector. The primary control device may be a microcontroller, for example, which controls or regulates the operation of the internal combustion engine containing the injector.

The microcontroller may, for example, establish an injection pattern to be used (quantity, position over time, and duration of the partial injections) and accordingly output one or multiple control instructions to the control module, the control instructions being used, among other things, to define in each case a desired control point in time for controlling the actuator. In the present case, controlling the actuator is understood to mean, for example, a charging process of a piezoelectric actuator or also a discharging process of the piezoelectric actuator. When the actuator of the injector is designed as an electromagnetic actuator, controlling the actuator may be understood to mean, for example, the action of an appropriate operating current on the actuator.

While the primary control device (microcontroller, for example) generally establishes the injection pattern to be implemented by the injector, i.e., the quantity, position over time, and duration of the multiple partial injections, the control module itself is used to directly electrically control the actuator of the injector. For this purpose, the control module receives one or multiple control instructions from the microcontroller, e.g., the point in time of transmitting the control instructions from the microcontroller to the control module in each case corresponding to the desired control point in time for controlling the actuator by the control module.

As a result of the confirmation signal, provided according to the present invention, which the control module sends back to the microcontroller, an option is advantageously provided for verifying in the microcontroller whether, and if so, at which exact point in time, the particular control instructions of the microcontroller to the control module have been implemented by the control module.

The control module may particularly preferably be designed to indicate the confirmation signals to the microcontroller in the form of interrupt requests. This advantageously ensures that the corresponding confirmation signals may be processed within the microcontroller with the shortest possible latency times. For example, after receiving an appropriate interrupt signal which represents a confirmation signal, the microcontroller is able to ascertain the input point in time of the interrupt signal, thus allowing the occurrence over time of the confirmation signal with respect to a time reference of the injection system, for example a crankshaft angle of the internal combustion engine containing the injector, to be established.

The provision of the confirmation signal according to the present invention thus allows the precise detection of an actual position over time or crankshaft angular position from control events which are directly derived from the control module. In contrast to conventional systems, in which only the operating variables which are present anyway in the primary control device are evaluated for a diagnosis, the method according to the present invention allows ascertainment of the operating variables which is preferably based on hardware and is therefore more precise, due to the fact that the confirmation signal is generated directly by the control module and thus more accurately reflects the actual operating conditions.

In another advantageous specific embodiment of the method according to the present invention, it is provided that a starting point in time and/or an end point in time of a partial injection is/are ascertained as a function of the confirmation signal.

In this specific embodiment, the control module according to the present invention accordingly indicates in particular a starting point in time and/or an end point in time of a partial injection, using the confirmation signal, thus advantageously allowing the corresponding input points in time of the interrupt requests to be in turn ascertained in the microcontroller and evaluated with respect to the crankshaft angle. In this way, in each case the point in time of, or crankshaft angle at, the actual implementation of a control instruction (starting point in time/end point in time of a charging or discharging process) may be identified and monitored in a particularly advantageous manner.

In another advantageous specific embodiment of the present invention, it is provided that after the confirmation signal is output, an actual value of at least one electrical operating variable of the actuator is ascertained which characterizes an operating state of the actuator or the injector.

The ascertainment may be carried out with the aid of the microcontroller, for example, in particular using an integrated analog-digital converter which, for example, detects a charging voltage of the piezoelectric actuator or another electrical operating variable of the actuator. This detection takes place in a particularly advantageous manner, using in each case a time reference to the confirmation signal previously received by the control module, so that particularly precise detection of operating variables of the actuator over time, and therefore particularly precise monitoring of the operation of the actuator or diagnosis of the actuator operation, is possible.

In another advantageous specific embodiment it is provided that the actual value is compared to a corresponding setpoint value, and an error response is triggered when the actual value deviates from the setpoint value by more than a predefinable threshold value.

A diagnosis of individual partial injections may be advantageously carried out in this way. For example, irregular states of the injector may be recognized in which a setpoint starting point in time and/or a setpoint end point in time deviate(s) from the setpoint value by more than a predefinable extent for only one of multiple partial injections.

In another advantageous specific embodiment of the operating method according to the present invention, it is provided that the control module ascertains an aggregated injection duration of multiple, preferably all, partial injections of the working cycle. The aggregated injection duration may be ascertained by the control module in a particularly efficient manner, since all partial injections and the corresponding controls of the actuator are carried out by same. In particular, this also relieves the microcontroller, which for the evaluation may be supplied with the aggregated injection duration when all partial injections have been completed, for example via a data connection provided for this purpose, for example a serial peripheral interface (SPI).

Another object of the present invention is to provide a control unit for operating an injector of an internal combustion engine.

The control unit according to the present invention is particularly advantageously designed for carrying out the method according to the present invention.

In one particularly preferred specific embodiment of the control unit according to the present invention, a control module for controlling the actuator is provided, a primary control device being provided which is designed to supply the control module with a control instruction as an input signal which characterizes a desired control point in time for controlling the actuator, and the control module being designed to output a confirmation signal, which indicates the implementation of the control instruction, to the primary control device after the control instruction has been implemented.

DETAILED DESCRIPTION OF THE INVENTION

Figure 1:
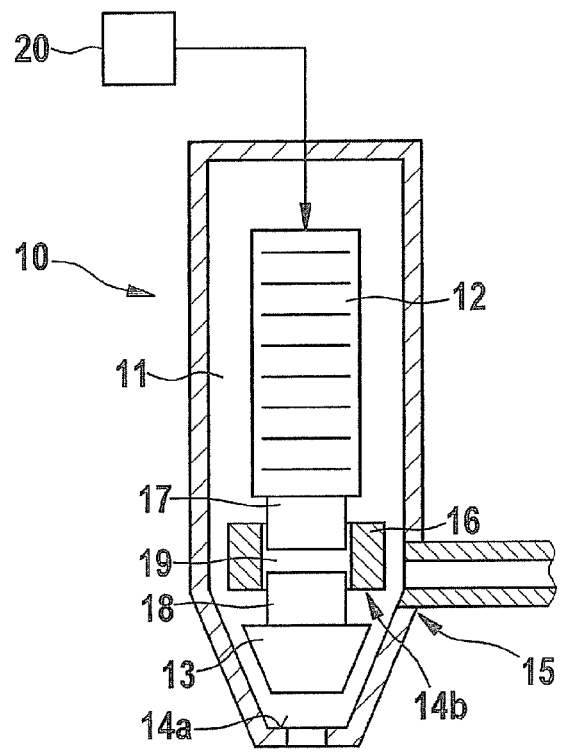
FIG. 1 shows a schematic sectional illustration of one exemplary embodiment of a fuel injector for carrying out the method according to the present invention.

FIG. 1 illustrates an injector of an internal combustion engine of a motor vehicle which is designed as a fuel injector 10 and provided with a piezoelectric actuator 12. Piezoelectric actuator 12 is controlled by a control unit 20, as indicated by the arrow in FIG. 1. Furthermore, fuel injector 10 has a valve needle 13, which may rest on a valve seat 14a inside the housing of fuel injector 10.

When valve needle 13 is lifted off from valve seat 14a, fuel injector 10 is opened and fuel is injected. This state is illustrated in FIG. 1. A completely open state of fuel injector 10 is characterized in that valve needle 13 rests against a needle stroke limit (not illustrated in greater detail) which is situated in region 14b and which prevents further motion of valve needle 13 away from its valve seat 14a, i.e., toward actuator 12. When valve needle 13 rests on valve seat 14a, fuel injector 10 is closed. This means that the overall stroke distance, which in the illustration according to FIG. 1 extends vertically, which valve needle 13 is able to cover is delimited on the one hand by valve seat 14a (closed position) and on the other hand by the needle stroke limit in region 14b (open position).

The transition from the closed state to the open state is brought about with the aid of piezoelectric actuator 12. For this purpose, an electrical voltage, also referred to below as an actuator voltage, is applied to actuator 12, and causes a change in length of a piezo stack, situated in actuator 12, which is used for opening or closing fuel injector 10.

Fuel injector 10 also has a hydraulic coupler 15. Hydraulic coupler 15 is situated inside fuel injector 10, and has a coupler housing 16 in which two pistons 17, 18 are guided. Piston 17 is connected to actuator 12, and piston 18 is connected to valve needle 13. A volume 19, which brings about the transmission of the force exerted by actuator 12 to valve needle 13, is included between the two pistons 17, 18.

Coupler 15 is surrounded by pressurized fuel 11. Volume 19 is likewise filled with fuel. Via the guide gap between the two pistons 17, 18 and coupler housing 16, over a fairly long period of time volume 19 is able to adapt to the particular prevailing length of actuator 12. However, for brief changes in the length of actuator 12, volume 19 remains practically unaltered, and the change in length of actuator 12 is transferred to valve needle 13.

As the result of control by control unit 20, injector 10 is preferably able to implement different injection patterns, which are characterized by a different quantity of partial injections and their position over time, i.e., the particular injection duration.

Figure 2:
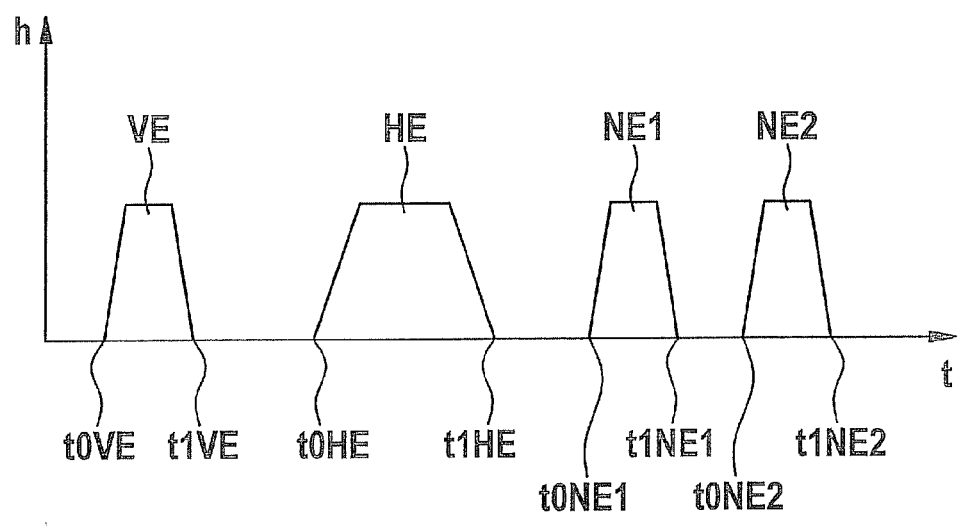
FIG. 2 schematically shows an injection pattern, having four partial injections, for the injector according to FIG. 1.

FIG. 2 shows an example of an injection pattern for injector 10 (FIG. 1), which has a total of four partial injections VE, HE, NE1, NE2. In the present case, the injection pattern is illustrated by the change over time of a stroke h of valve needle 13 (FIG. 1), starting from its closed position in seat 14a.

First partial injection VE is a partial injection, also referred to as a pre-injection, which is usually carried out during a compression phase of a cylinder of the internal combustion engine associated with injector 10 (FIG. 1), in particular for acoustic reasons. Main injection HE follows pre-injection VE. According to FIG. 2, main injection HE is followed by a total of two subsequent injections NE1, NE2 which are used, among other things, to heat up an exhaust system of the internal combustion engine.

The injection durations of individual partial injections VE, HE, NE1, NE2 are defined by starting points in time t0VE, t0HE, . . . and end points in time t1VE, t1HE, . . . , likewise illustrated in FIG. 2.

According to the present invention, it is provided that a starting point in time t0VE, t0HE of the at least two partial injections VE, HE, respectively, is ascertained to allow the operation of injector 10 (FIG. 1) to be precisely diagnosed. Control unit 20, in particular, may monitor whether the particular partial injection VE, HE actually occurs at the point in time that has been specified by control unit 20.

In another preferred specific embodiment it is provided that an end point in time t1VE, t1HE, . . . of at least one partial injection VE, HE, respectively, is ascertained, thus allowing for even more precise monitoring of the operation of injector 10. In particular by ascertaining starting point in time t0VE as well as end point in time t1VE of a partial injection (in the present case pre-injection VE), injection duration t1VE-t0VE may advantageously be ascertained, and thus likewise monitored. Based on injection duration t1VE-t0VE, the fuel quantity that is actually injected, among other things, may also be deduced in a manner known per se.

In one particularly preferred specific embodiment of the operating method according to the present invention, control unit 20 monitors the starting points in time and end points in time of all partial injections VE, HE, NE1, NE2, thus providing a particularly comprehensive diagnosis of the operation of injector 10.

For example, an error response may be triggered by control unit 20 when a no longer tolerable deviation of the starting point in time and/or of the end point in time, i.e., of the particular injection duration, from a predefinable setpoint value has/have been identified for one or multiple partial injections.

Figure 3:
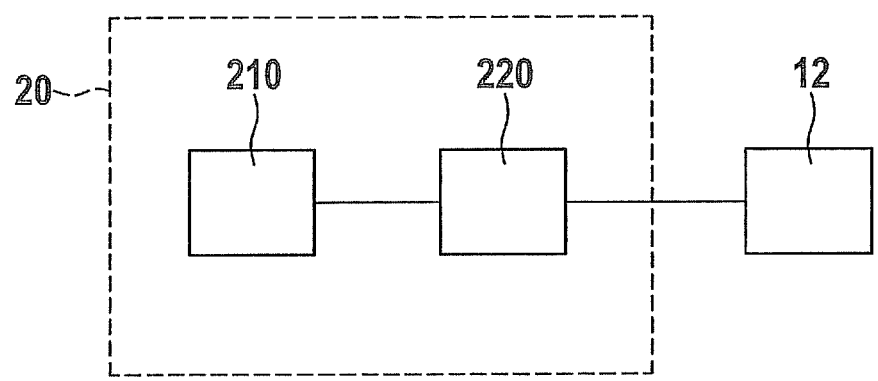
FIG. 3 schematically shows a simplified block diagram of a control unit according to one specific embodiment.

FIG. 3 schematically shows a block diagram of control unit 20. Control unit 20 has a primary control device 210 which is, for example, a microcontroller or a digital signal processor or the like. Primary control device 210 may be provided in a particularly advantageous manner for controlling and/or regulating an operation of an internal combustion engine containing injector 10, among other things. In the present case, a portion of the functionality required for controlling actuator 12 of injector 10 (FIG. 1) is implemented in control module 220 (FIG. 3), which is designed as an application-specific integrated circuit (ASIC), for example.

In one preferred specific embodiment of the present invention, ASIC 220 contains, among other elements, semiconductor switches (not shown) which are designed to connect piezoelectric actuator 12 of injector 10 to a voltage source as a function of a control specified by primary control device 210, for example to carry out a charging process of piezoelectric actuator 12, and the like. Similarly, ASIC 220 may also be provided for discharging piezoelectric actuator 12.

Microcontroller 210 is designed, for example, in such a way that it sends appropriate control instructions to ASIC 220 at certain points in time, whereupon ASIC 220 carries out the actual charging or discharging process of actuator 12.

For example, for achieving pre-injection VE (FIG. 2) at a point in time t0VE which corresponds to a desired starting point in time of pre-injection VE, microcontroller 210 may send an appropriate control instruction to control module 220, which then initiates a control operation of actuator 12. In the actuator configuration illustrated in FIG. 1, this control, assuming a closed injector 10, may be carried out, for example, in that control module 220 discharges actuator 12 by a predefinable extent so that valve needle 13 is moved from its seat 14a in order to allow a fuel injection. Similarly as for the specification of the starting point in time for pre-injection VE, after a desired injection duration for pre-injection VE, microcontroller 210 may once again output an appropriate control instruction to control module 220 in order to trigger a closing operation of injector 10. After receipt of the appropriate control instruction, control module 220 charges piezoelectric actuator 12 to a predefinable voltage, so that valve needle 13 is moved back into its closed position, thus terminating pre-injection VE.

To allow for a particularly accurate diagnosis of the operation of injector 10, in the configuration of control unit 20 according to FIG. 3 it is advantageously provided that control module 220 is designed to output a confirmation signal, indicating the implementation of the control instruction, to primary control device 210 after the implementation of a control instruction which the control module has previously received from primary control device 210. This confirmation signal may be used, for example, to trigger an interrupt in microcontroller 210. The interrupt in microcontroller 210 may be triggered in a manner known per se via an appropriate digital control line (not shown) from control module 220 to microcontroller 210.

Only when microcontroller 210 has received an appropriate confirmation signal from control module 220 is microcontroller 210 able to deduce that the control instruction previously sent to control module 220 has actually been implemented. It is particularly advantageous that a point in time of the reception of the confirmation signal is recorded in the software routine of microcontroller 210 which processes the confirmation signal, so that the change in operating state (for example, the start of the charging process of actuator 12) which is indicated by the confirmation signal to microcontroller 210 may be linked to a corresponding temporal reference. A confirmation signal which is received in microcontroller 210 within the scope of an interrupt routine is particularly advantageously associated with a time reference, which, for example, represents a crankshaft angle of an internal combustion engine, contained by injector 10.

Figure 4:
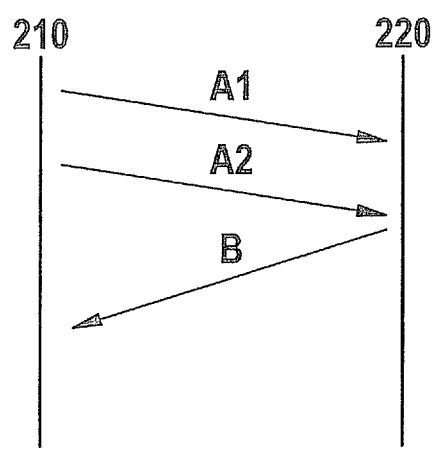
FIG. 4 shows a communication diagram according to another specific embodiment.

The communication diagram in FIG. 4 shows various messages which are exchanged between microcontroller 210 and control module 220 within the scope of the operating method according to the present invention.

Microcontroller 210 initially sends a first control instruction A1 to control module 220, which then carries out appropriate control of actuator 12. This control may be, for example, the start of a charging process of piezoelectric actuator 12.

After a certain period of time, microcontroller 210 sends another control instruction A2 to control module 220. Control instruction A2 indicates to control module 220 that the control process (charging process) previously initiated by control instruction A1 is now to be terminated. Control module 220 then terminates the particular control operation of actuator 12. After the control operation has been successfully terminated, control module 220 sends a confirmation signal B back to microcontroller 210, which in the present case represents the actual end of the charging process. Based on the receipt of confirmation signal B, microcontroller 210 is advantageously able to deduce that control module 220 has successfully implemented the other control instruction A2. In one particularly preferred specific embodiment of the present invention, confirmation signal B of control module 220 is used to activate an interrupt routine in microcontroller 210. This allows a rapid response by microcontroller 210 to the receipt of confirmation signal B in a manner known to one skilled in the art.

In particular, after confirmation signal B is received in microcontroller 210 a crankshaft angle is detected, which establishes a temporal reference of confirmation that control instruction A2 for operation of injector 10 has been carried out. This means that, after the receipt of confirmation signal B and the detection of the corresponding crankshaft angle signal, microcontroller 210 may assume that the control by control module 220 corresponding to control instruction A2 has been successfully completed no later than upon receipt of confirmation signal B of the detected crankshaft angle.

Highly accurate detection of the occurrence over time of the implementation points in time of control instruction A2 by control module 220 is thus provided.

The information received in microcontroller 210 (confirmation signal B and the crankshaft angle corresponding thereto) may advantageously be used for a diagnostic method in which the actual point in time of, or crankshaft angle at, the carrying out of control instruction A2 is compared to a setpoint value for carrying out control instruction A2 which is likewise present in microcontroller 210. As soon as, for example, an appropriate period of time for carrying out control instruction A2 deviates from the actual point in time of receipt of confirmation signal B by more than a predefinable extent, an error response may be triggered.

The principle according to the present invention explained above with reference to FIG. 4 may advantageously be used for control module 220 to inform microcontroller 210 of various operating events of injector 10 or of actuator 12. For example, control module 220 may be designed in such a way that it sends a confirmation signal B to microcontroller 210 after the completion of a charging process or a discharging process of piezoelectric actuator 12. The acknowledgment of other control instructions is also conceivable.

Control module 220 may also have an integrator device which during a charging or discharging process of piezoelectric actuator 12 integrates the electric charge which has flowed from or to piezoelectric actuator 12 over the control period, and provides an integral value obtained therefrom to microcontroller 210, for example, preferably via an analog interface. In this variant of the present invention, confirmation signal B according to the present invention, which initiates an interrupt routine of microcontroller 210, may be used to trigger an appropriate charge measurement by microcontroller 210.

When a piezoelectric actuator 12 is used, a charge measurement of this type may advantageously be carried out for all partial injections VE, HE, NE1, NE2 (FIG. 2) of injector 10. Alternatively or additionally, ASIC 220 may also aggregate the charging values of all partial injections carried out within an injection pattern.

ASIC 220 may also be designed to detect and optionally sum the control durations, i.e., the injection times, of some or all partial injections and provide same to microcontroller 210 for evaluation. Corresponding time measurements in ASIC 220 may in turn be triggered by the receipt of appropriate control instructions A1, A2.

Particularly precise measured values may be obtained and provided to microcontroller 210 for evaluation as a result of the charge or time measurement in situ, i.e., in ASIC 220, which carries out the actual electrical control of actuator 12.

In another advantageous variant of the present invention, it is provided that the results of this type of a charge measurement and/or time measurement of the partial injection(s) are once again compared to corresponding setpoint values in order to carry out a plausibility check, which in particular occurs in microcontroller 210.

The principle according to the present invention allows an advantageous diagnosis of individual partial injections, and in particular also of certain parameters (starting point in time of charging/discharging, end point in time of charging/discharging, injection duration) of the partial injections, so that overall a particularly precise diagnosis of the operation of injector 10 is made possible.

All values which are ascertainable according to the present invention may be compared to corresponding setpoint values which are different for the individual partial injections, and in the event of discrepancies or deviations which are above an applicable predefinable threshold value, control unit 20 may trigger an error response.

A confirmation signal B may be output within control module 220, for example, in that confirmation signal B is triggered by a state change of a semiconductor switch which is provided for charging or discharging piezoelectric actuator 12. This means that when the appropriate semiconductor switch experiences a switching state change, a confirmation signal may be delivered to microcontroller 210, or an appropriate interrupt may be triggered there.

The interfaces between microcontroller 210 and control module 220 may be designed in such a way, for example, that they allow the transmission of control instructions A1, A2 (FIG. 4) as well as the transmission of confirmation signal B (FIG. 4). In addition, an interface may be provided which allows the transmission of analog values from control module 220 to microcontroller 210, for example to transmit a value of an electric charge ascertained by control module 220, which has been applied to piezoelectric actuator 12, to microcontroller 210. A charging voltage, for example, may also be relayed to microcontroller 210 via an analog interface of this type.

In general, communication interfaces which are known per se, for example a serial peripheral interface (SPI) for data communication between components 210, 220, may also be provided.

An injection system of an internal combustion engine of a motor vehicle may have, for example, control unit 20 schematically illustrated in FIG. 3, and control unit 20, in addition to primary control device 210 and component 220 illustrated in FIG. 3 as an example, may also contain multiple control modules 220, in each case two injectors 10, for example, being controllable with the aid of a control module 220.

The method according to the present invention may generally be used for all internal combustion engines (spark-ignited or auto-igniting) in which partial injections are carried out.

What is claimed is:

1. A method for operating an injector of an internal combustion engine in which an actuator for driving a component of the injector is provided, comprising:
    controlling the actuator to provide at least two partial injections within a working cycle of the internal combustion engine; and
    ascertaining, for each of the at least two partial injections, an actual starting point in time at which the respective partial injection started.

2. The method as recited in claim 1, further comprising:
    ascertaining an actual end point in time at which at least one of the at least two partial injections ended.

3. The method as recited in claim 2, further comprising:
    comparing the ascertained starting points to their corresponding starting setpoint values;
    comparing an ascertained end point to its corresponding end setpoint value; and
    performing an error response in response to at least one of:
        a deviation of at least one of the ascertained starting points from its corresponding starting setpoint value, and
        a deviation of the ascertained end point from its corresponding end setpoint value.

4. The method as recited in claim 3, wherein the error response comprises storing, into a memory of a control unit, an error entry corresponding to a deviation.

5. The method as recited in claim 1, further comprising:
    ascertaining, for at least one of the at least two partial injections, an actual time during which the injection endured.

6. The method as recited in claim 5, further comprising:
    comparing the ascertained starting points to their corresponding starting setpoint values;
    comparing an ascertained time to its corresponding time setpoint value; and
    performing an error response in response to at least one of:
        a deviation of at least one of the ascertained starting points from its corresponding starting setpoint value, and
        a deviation of the ascertained time from its corresponding time setpoint value.

7. The method as recited in claim 6, wherein the error response comprises storing, into a memory of a control unit, an error entry corresponding to a deviation.

8. The method as recited in claim 1, further comprising:
    ascertaining, for each of the at least two partial injections, at least one of an actual end point in time at which the respective injection ended and an actual time during which the respective injection endured.

9. The method as recited in claim 1, wherein:
    a control module for controlling the actuator is provided;
    the control module is supplied with a control instruction as an input signal which characterizes a desired control point in time for controlling the actuator; and
    after the control instruction has been implemented, the control module outputs a confirmation signal which indicates the implementation of the control instruction.

10. The method as recited in claim 9, wherein at least one of an actual starting point in time at which at least one of the two partial injections started and an actual end point in time at which at least one of the two partial injections ended is ascertained as a function of the confirmation signal.

11. The method as recited in claim 9, wherein after the confirmation signal is output, an actual value of at least one electrical operating variable of the actuator is ascertained which characterizes an operating state of one of the actuator or the injector.

12. The method as recited in claim 11, wherein the actual value of the at least one electrical operating variable is compared to a setpoint value, and an error response is triggered when the actual value deviates from the setpoint value by more than a predefined threshold value.

13. The method as recited in claim 9, wherein the control module ascertains an aggregated actual injection duration of the times during which all partial injections of the working cycle endured.

14. The method as recited in claim 1, further comprising:
    comparing the ascertained starting points to their corresponding starting setpoint values; and
    performing an error response in response to a deviation of at least one of the ascertained starting points from its corresponding starting setpoint value.

15. The method as recited in claim 14, wherein the error response comprises storing, into a memory of a control unit, an error entry corresponding to the deviation.

16. A system for controlling operation of an injector of an internal combustion engine in which an actuator for driving a component of the injector is provided, comprising:
    a control unit configured to (i) control the actuator to provide at least two partial injections within a working cycle of the internal combustion engine, and (ii) ascertain, for each of the at least two partial injections, an actual starting point in time at which the respective partial injection started.

17. The control unit as recited in claim 16, wherein the control unit is configured to ascertain an actual end point in time at which at least one of the at least two partial injections ended.

18. The control unit as recited in claim 16, wherein the control unit includes:
    a control module for controlling the actuator; and
    a primary control device supplying the control module with a control instruction as an input signal which characterizes a desired control point in time for controlling the actuator;
    wherein the control module is configured to output a confirmation signal, which indicates the implementation of the control instruction, to the primary control device after the control instruction has been implemented.

19. The control unit as recited in claim 18, wherein the control module is configured to ascertain an aggregated actual injection duration of the times during which all partial injections of the working cycle endured, and output the aggregated actual injection duration to the primary control device.

* * * * *